United States Patent
Lang et al.

(10) Patent No.: US 12,519,363 B2
(45) Date of Patent: Jan. 6, 2026

(54) SUPPORT DEVICE FOR A ROTOR WITH A ROVING WINDING

(71) Applicant: Bayerische Motoren Werke Aktiengesellschaft, Munich (DE)

(72) Inventors: Markus Lang, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 184 days.

(21) Appl. No.: 18/682,470

(22) PCT Filed: Aug. 10, 2022

(86) PCT No.: PCT/EP2022/072398
§ 371 (c)(1),
(2) Date: Feb. 9, 2024

(87) PCT Pub. No.: WO2023/041257
PCT Pub. Date: Mar. 23, 2023

(65) Prior Publication Data
US 2024/0364174 A1 Oct. 31, 2024

(30) Foreign Application Priority Data
Sep. 20, 2021 (DE) ...................... 10 2021 124 234.7

(51) Int. Cl.
*H02K 1/24* (2006.01)
*H02K 3/52* (2006.01)

(52) U.S. Cl.
CPC ............... *H02K 3/527* (2013.01); *H02K 1/24* (2013.01)

(58) Field of Classification Search
CPC ............ H02K 3/527; H02K 1/24; H02K 1/28; H02K 15/022; H02K 3/51
See application file for complete search history.

(56) References Cited

U.S. PATENT DOCUMENTS

| 3,601,646 A | 8/1971 | Balke et al. |
| 2014/0091670 A1 | 4/2014 | Chun et al. |

(Continued)

FOREIGN PATENT DOCUMENTS

| DE | 1 055 108 A | 4/1959 |
| DE | 103 00 796 A1 | 7/2004 |

(Continued)

OTHER PUBLICATIONS

International Search Report (PCT/ISA/210) issued in PCT Application No. PCT/EP2022/072398 dated Nov. 28, 2022, with English translation (4 pages).

(Continued)

*Primary Examiner* — Leda T Pham
(74) *Attorney, Agent, or Firm* — Crowell & Moring LLP

(57) ABSTRACT

A salient pole rotor includes a rotor core which has a rotor yoke and salient poles arranged distributed over the rotor yoke in the circumferential direction, magnetic field-generating windings which are wound around rotor teeth of the salient poles and form end windings at opposite end sides of the rotor core, and a support device for supporting the end windings. The support device has a clamping and deflecting device and a roving winding with a roving by way of which a plurality of turns offset in the circumferential direction and encompassing the windings of a respective salient pole pair are formed and which for this purpose has axial first roving portions and end-side second roving portions. The second roving portions are guided over the end windings for forming a turn between radially opposite salient poles and are deflected along the circumferential direction for forming an interturn transition between two turns.

11 Claims, 5 Drawing Sheets

(56) References Cited

U.S. PATENT DOCUMENTS

| | | | |
|---|---|---|---|
| 2020/0083776 A1* | 3/2020 | Patel | H02K 3/51 |
| 2021/0050761 A1* | 2/2021 | Loos | H02K 1/24 |
| 2022/0131429 A1* | 4/2022 | Bach | H02K 15/022 |

FOREIGN PATENT DOCUMENTS

| | | |
|---|---|---|
| DE | 10 2018 128 521 A1 | 5/2020 |
| DE | 10 2019 218 603 A1 | 6/2021 |
| JP | 55-14613 B1 | 4/1980 |
| JP | 63-28243 A | 2/1988 |

OTHER PUBLICATIONS

German-language Written Opinion (PCT/ISA/237) issued in PCT Application No. PCT/EP2022/072398 dated Nov. 28, 2024, with English translation (8 pages).

German Search Report issued in German Application No. 10 2021 124 234.7 dated May 3, 2022, with partial English translation (13 pages).

\* cited by examiner

SUPPORT DEVICE FOR A ROTOR WITH A ROVING WINDING

BACKGROUND AND SUMMARY

The invention relates to a salient pole rotor for an electric machine. The salient pole rotor has a rotor core which has a rotor yoke and salient poles which are arranged distributed in the circumferential direction on the rotor yoke. Two salient poles which lie opposite one another each form a salient pole pair. The salient poles each have a rotor tooth and a pole shoe. Moreover, the salient pole rotor comprises magnetic field-generating windings which are wound around the rotor teeth of the salient poles and configure winding heads on opposite end sides of the rotor core, and a supporting apparatus for supporting the winding heads. Moreover, the invention relates to an electric machine.

In the present case, interest is focused on electric machines which can be used, for example, as drive machines for electrified motor vehicles, that is to say electric or hybrid vehicles. Electric machines of this type usually have a stationary stator with energizable stator windings, and a rotor which is mounted rotatably with regard to the stator. In the case of a separately excited machine, the rotor also has energizable rotor windings. These can be wound around salient poles or rotor poles of a rotor core of the rotor in the case of a rotor of salient pole design. The windings are guided over star disks which are arranged on the end sides of the laminated core which lie axially opposite one another, for example with the configuration of winding heads. The winding heads are each encased by an end cap or a supporting ring for stability reasons. The supporting rings can be connected mechanically to the respective star disk, for example via a bayonet fitting. As a result of the star disks/supporting ring construction, the winding heads are supported on the outermost region of the salient pole rotor, on which the greatest centrifugal forces act. This can lead to the winding heads being supported only insufficiently at high rotational speeds, in particular in the region of connector wires of the winding heads to the current transmitter.

It is an object of the present invention to provide a supporting apparatus for a salient pole rotor of an electric machine with a particularly high supporting action.

This object is achieved by way of a salient pole rotor and an electric machine with the features in accordance with the claimed invention.

A salient pole rotor according to embodiments of the invention for an electric machine comprises a rotor core which has a rotor yoke and salient poles which are arranged distributed in the circumferential direction on the rotor yoke, two salient poles which lie radially opposite one another each forming a salient pole pair, and the salient poles each having a rotor tooth and a pole shoe. Moreover, the salient pole rotor has magnetic field-generating windings which are wound around the rotor teeth of the salient poles and configure winding heads on opposite end sides of the rotor core, and a supporting apparatus for supporting the winding heads. The supporting apparatus has a tensioning and deflecting device and a roving winding with at least one roving. By way of the roving, a plurality of windings are formed which are offset in the circumferential direction and encompass the windings of in each case one salient pole pair. The roving has, to this end, axial first roving portions and end-side second roving portions, the second roving portions being guided over the winding heads by way of the tensioning and deflecting device in order to configure a winding between salient poles which lie radially opposite one another, and being deflected along the circumferential direction during guiding over the winding heads in order to configure a winding transition between two windings.

Moreover, an electric machine with a stator and a salient pole rotor according to embodiments of the invention is mounted rotatably with regard to the stator. The electric machine is configured, in particular, as an energized internal rotor synchronous machine (SSM). The electric machine is, in particular, a traction machine of an electrified motor vehicle.

The rotor core of the salient pole rotor is configured, for example, as a laminated core consisting of electric laminations which are stacked axially and are connected to one another. The rotor core has the rotor yoke which is, for example, annular and through which a rotor shaft can be guided and can be connected to the rotor core fixedly for conjoint rotation. The rotor teeth are arranged so as to project radially on the rotor yoke and so as to be spaced apart from one another in the circumferential direction. The circular segment-shaped pole shoes are arranged on the rotor teeth. Part regions of the pole shoes project here along the circumferential direction, with the result that winding conductors of the windings which are wound around the rotor teeth are arranged radially between the pole shoes and the rotor yoke and are held on the rotor teeth by the pole shoes during the rotation of the salient pole rotor.

Moreover, a star disk which serves to guide the winding conductors over the end sides of the rotor core can be arranged in each case on the axially opposite end sides of the rotor core. The geometric shape of the star disks corresponds here to the salient pole design of the rotor core. The winding conductor portions which are guided over the end sides configure the winding heads. Here, they can be held on the star disks by axially projecting overhangs of the star disks during the rotation of the rotor, and can therefore be supported against the centrifugal forces which act during the rotation. In order to improve the supporting action of the star disks counter to the centrifugal forces, moreover, the salient pole rotor has the supporting apparatus.

The supporting apparatus has a roving. A roving is to be understood to mean a bundle or strand of filaments (endless fibers) which are arranged in parallel. The roving is configured, in particular, as a plastic fiber bundle or glass fiber bundle. This roving or this fiber bundle is wound in multiple windings in pairs around the energizable windings in such a way that two salient poles which lie opposite one another are each mechanically connected and braced under tension. Here, the windings of each salient pole pair are surrounded by at least one winding. The roving winding or fiber bundle winding preferably has at least two windings for each salient pole pair. Here, at least one winding is arranged in each case on those pole shoe regions of the pole shoes which lie opposite one another in the circumferential direction and project on the respective rotor teeth. The windings extend along the windings in the case of an axial direction and over the winding heads in the radial direction, and are arranged offset in the circumferential direction with respect to one another, two windings being connected in each case via a winding transition. The tensioning and deflecting device is provided to arrange the windings in a manner which is offset in the circumferential direction and to guide the second, end-side roving portions past the rotor shaft of the salient pole rotor. The tensioning and deflecting device has, in particular, two tensioning and deflecting rollers which are arranged on the axially opposite end sides of the rotor core fixedly for conjoint rotation. For example, the tensioning and deflecting rollers are connected on both end sides fixedly for conjoint rotation to the rotor shaft which is guided through the rotor core. The tensioning and deflecting rollers have, in particular, a plurality of guide grooves which are arranged axially above one another for deflecting the second roving portions and guiding them past the rotor shaft of the salient pole rotor.

For mounting the supporting apparatus on the salient pole rotor, in particular, a roving start of the roving is wound multiple times around the first tensioning and deflecting roller in order to fix the roving by way of configuration of a roving tension. Starting from the first tensioning and deflecting roller, the roving is guided over the winding head of the first end side to a first salient pole of a first salient pole pair, and is guided axially along the winding of this salient pole from the first end side to the second end side. There, the roving is guided by way of the second tensioning and deflecting roller over the winding head of the second end side, past the rotor shaft, to a radially opposite second salient pole of the first salient pole pair. From there, the roving is guided axially along the winding of the second salient pole back to the first end side, where it is guided by way of the first tensioning and deflecting roller with completion of the first winding over the winding head of the first end side. Here, the roving is deflected by way of the first tensioning and deflecting roller along the circumferential direction, with the result that a second winding which is arranged offset with respect to the first winding is started. Here, the roving is deflected along the circumferential direction to such an extent that the second winding either again begins at the first salient pole and therefore a further winding for the first salient pole pair is wound, or that the second winding begins at a salient pole of a second salient pole pair and therefore a winding for the second salient pole pair is wound. Here, so many windings are produced that each salient pole pair is wound around by way of at least one winding.

A supporting device of this type which is formed by way of a tensioning and deflecting device and a roving winding has a high supporting effect with respect to centrifugal forces, in particular at high rotational speeds.

Axially extending gaps are particularly preferably formed between the windings and the pole shoes of the salient poles, in which gaps the first, axial roving portions are arranged. Here, the gaps are open and therefore accessible merely over pole gaps which are formed between two salient poles. Here, the roving is first of all deflected along the circumferential direction, in order for it to be possible for it to be arranged in the pole gaps and to be pushed or threaded tangentially into the gap. Here, in particular, the star disks have insertion aids for the insertion of the first roving portions into the gaps. For example, the insertion aids are configured as pins, projecting axially on the winding heads, of the star disks, between which the roving is arranged in the region of the transition between the first roving portions and the second roving portions. The pins which are arranged, in particular, on the axial overhangs of the star disks are designed to prevent slipping of the second roving portions along the circumferential direction during the insertion of the roving into the gaps. The roving is fixed in regions on the respective salient pole by way of the pins, with the result that the second roving portion which is guided over the winding head does not slip along the circumferential direction during the threading-induced deflecting movement.

In one advantageous development of the invention, the salient pole rotor has supporting rings which are configured on the end sides in order to encase the winding heads, cavities below the supporting rings, in which the winding heads and the roving winding are arranged, being filled with a potting material in order to configure a fiber composite material which comprises the roving winding. The supporting rings or end caps have, in particular, a cylindrical shell, which cylindrical shells bear tightly against an outer side of the axially projecting overhangs of the star disks and are connected mechanically to the latter. A cover of the supporting rings which overlaps with the end sides has filling openings, via which the potting compound can be filled in order to further increase the supporting action.

The embodiments proposed in relation to the salient pole rotor described herein and their advantages apply mutatis mutandis to the electric machine described herein.

Further features of the invention result from the claims, the figures, and the description of the figures. The features and combinations of features mentioned above in the description and the features and combinations of features mentioned in the description of the figures below and/or shown solely in the figures can be used not only in the respective specified combination, but rather also in other combinations or on their own.

The invention will now be explained in greater detail on the basis of one preferred exemplary embodiment and with reference to the drawings.

DETAILED DESCRIPTION OF THE DRAWINGS

In the figures, identical and functionally identical elements are provided with the same designations.

Figure 1:
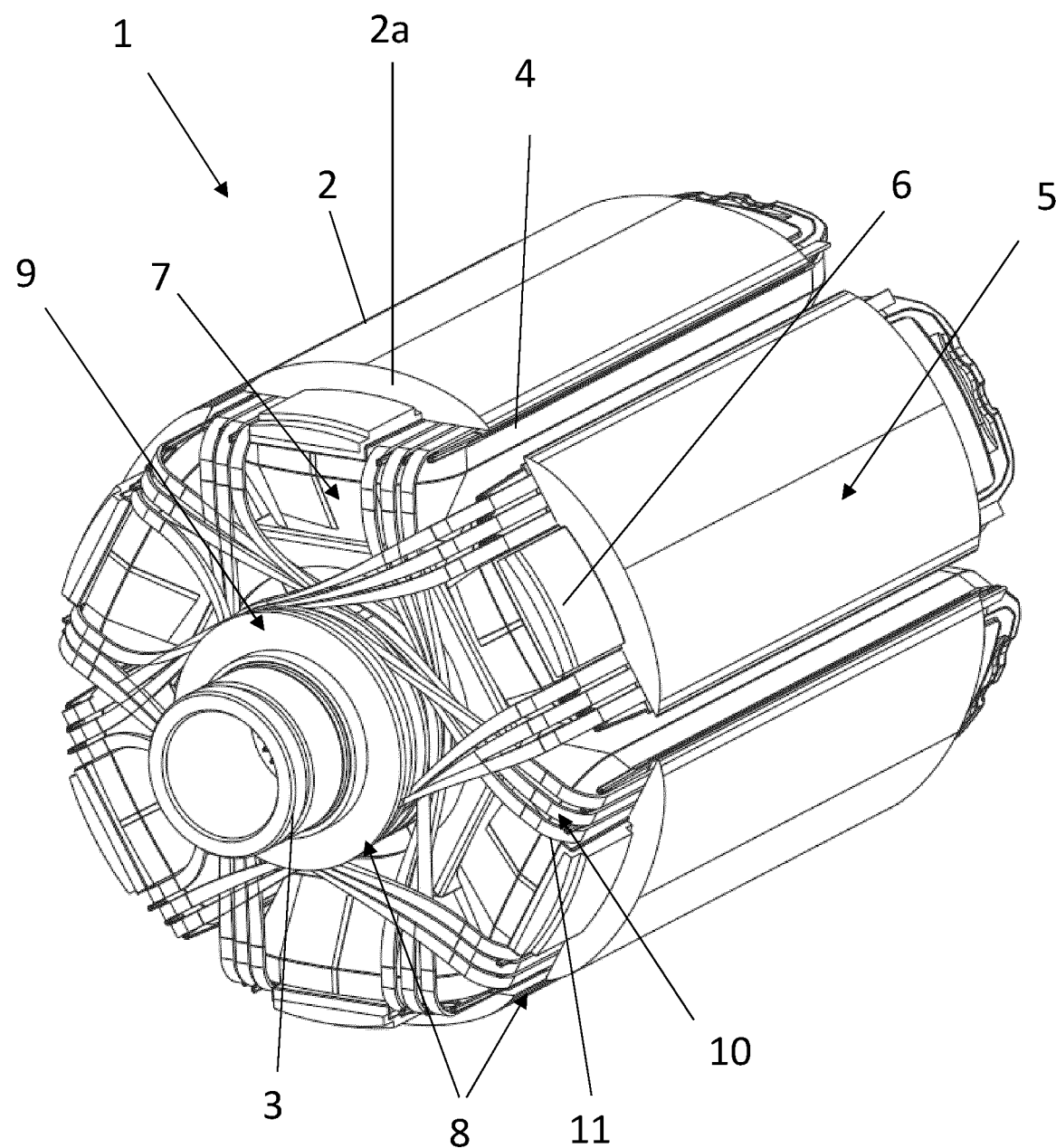
FIG. 1 shows a diagrammatic perspective illustration of components of a salient pole rotor for an electric machine.

FIG. 1 shows components of a salient pole rotor 1 for an energized electric machine (not shown here). The salient pole rotor 1 has a rotor core 2 which is connected fixedly to a rotor shaft 3 for conjoint rotation for the transmission of torque. The rotor core 2 serves to hold and to conduct a magnetic field of energizable windings 4 of the salient pole rotor 1. In order to configure a winding 4, wire-shaped winding conductors are wound here around in each case one salient pole 5 of the rotor core 2 and are guided over star disks 6 which are arranged on opposite end sides 2a of the rotor core 2. The windings 4 configure winding heads 7 on the star disks 6. In order to support the winding heads 7 with respect to centrifugal forces during operation of the electric machine, moreover, the salient pole rotor 1 has a supporting apparatus 8.

Figure 2:
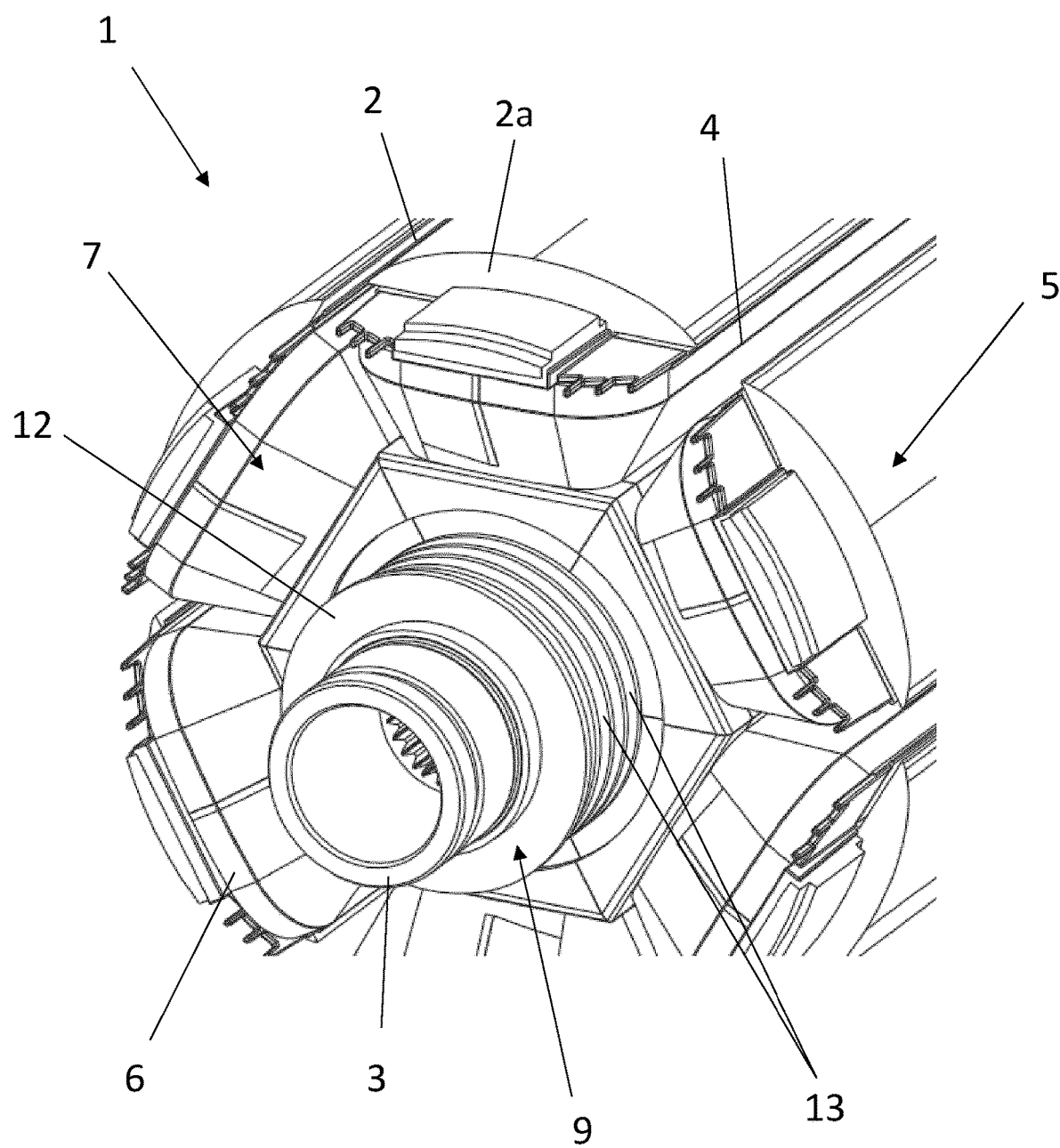
FIG. 2 shows an enlarged detail of the salient pole rotor without a roving winding.
Figure 3:
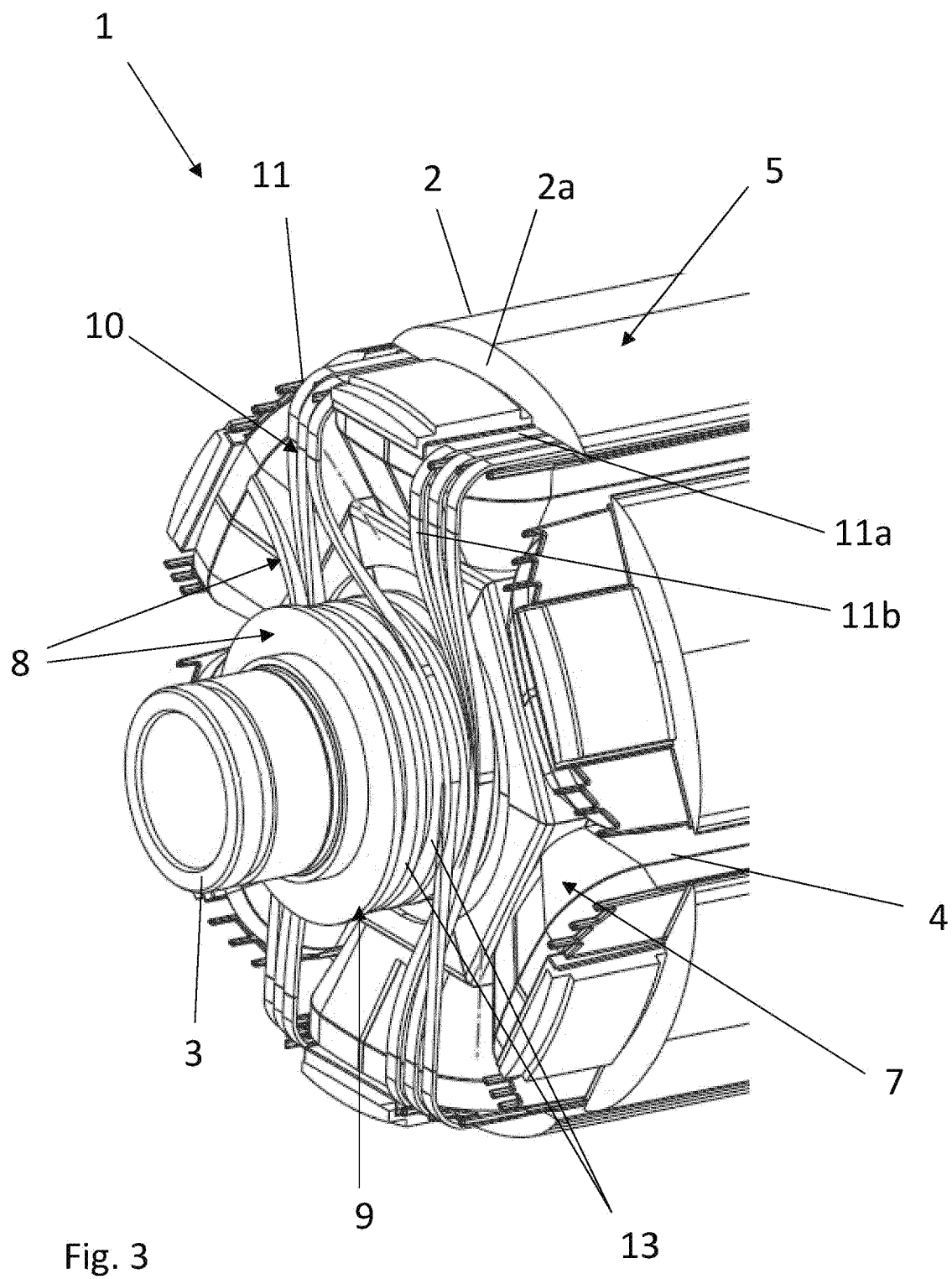
FIG. 3 shows an enlarged detail of the salient pole rotor with the roving winding.

The supporting apparatus 8 has a tensioning and deflecting device 9, and a roving winding 10 made from a roving 11. The roving 11 can be, for example, a plastic fiber bundle or a glass fiber bundle. FIG. 2 shows a detail of the salient pole rotor 1 without the roving winding 10, and FIG. 3 shows a detail of the salient pole rotor 4 with the roving winding 10 from a further perspective. The tensioning and deflecting device 9 has two tensioning and deflecting rollers 12, in each case one tensioning and deflecting roller 12 being arranged on an end side 2a of the rotor core 2. Here, the tensioning and deflecting rollers 12 are fastened to the rotor shaft 3. The tensioning and deflecting rollers 12 have a plurality of guide grooves 13 which are arranged axially above one another and run around in the circumferential direction, and via which the roving 11 can be guided, for example diametrically, past the rotor shaft 3 over the winding heads 7 of the end sides 2a of the rotor core 2 and/or can be deflected along the circumferential direction during the guiding over the winding heads 7 of the end sides 2a of the rotor core 2.

Figure 4:
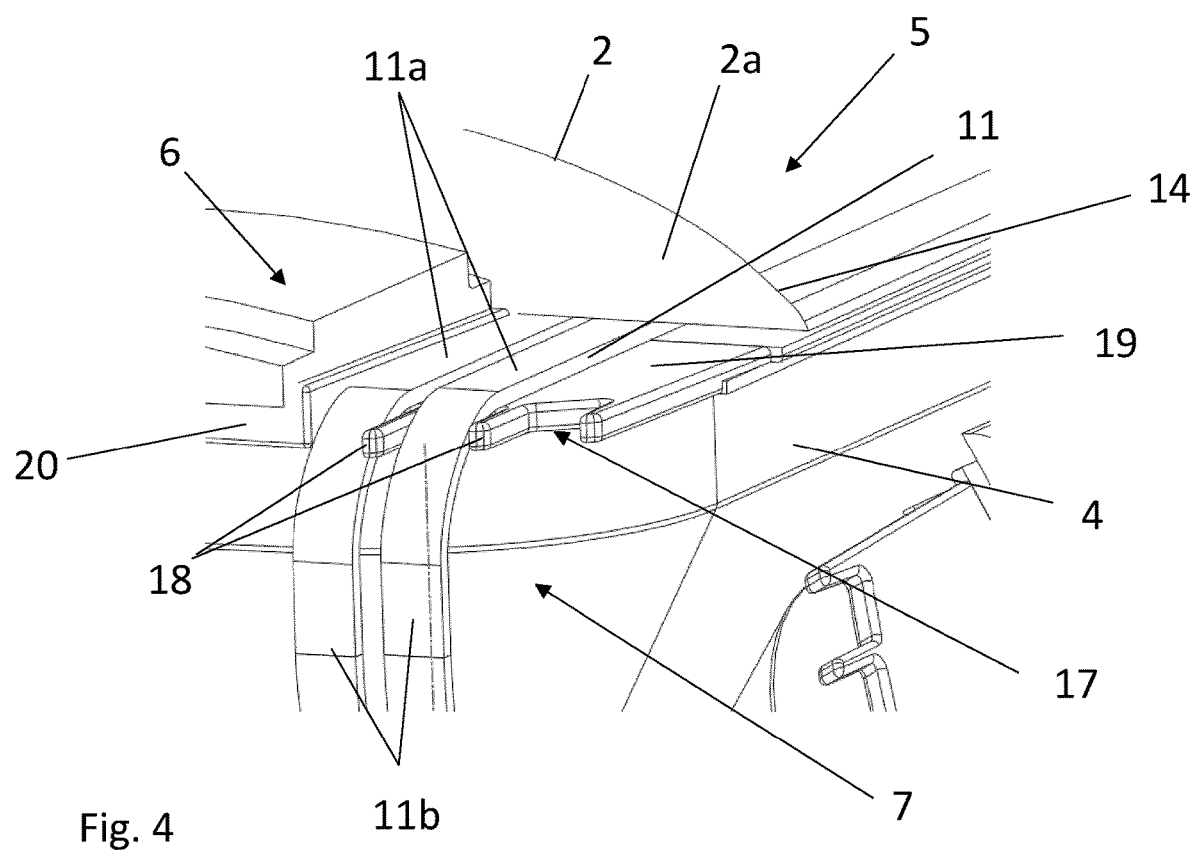
FIG. 4 shows an enlarged detail of the salient pole rotor in the region of an end side of the salient pole rotor.

Here, the roving 11 has first roving portions 11a which extend axially, and second roving portions 11b which extend along the end sides 2a. FIG. 4 shows a detail of the salient pole rotor 1 in the region of the transition between the first roving portions 11a and the second roving portions 11b. Here, the roving 11 configures a plurality of windings which are arranged offset along the circumferential direction, each winding encompassing two opposite windings 4 and therefore supporting two opposite salient poles 5 counter to the centrifugal force. Here, six windings are provided per salient pole pair which is formed from two radially opposite salient poles 5. Here, each winding comprises two axial first roving portions 11a, the one roving portion 11a being arranged on the one salient pole 5 of a salient pole pair, and the other roving portion 11a being arranged on the other salient pole 5 of the same salient pole pair. Moreover, each winding comprises two second roving portions 11b, the one roving portion 11b being arranged on the one end side 2a, and the other roving portion 11b being arranged on the axially opposite other end side 2a. Here, the one roving portion 11b is guided by way of the tensioning and deflecting roller 12 from the one salient pole 5 to the radially opposite salient pole 5 over the winding head 7 of the end side 2a past the rotor shaft 3. The other, axially opposite, end-side roving portion 11b is deflected by way of the tensioning and deflecting roller on the other end side 2a, and therefore configures a winding transition between two windings.

Figure 5:
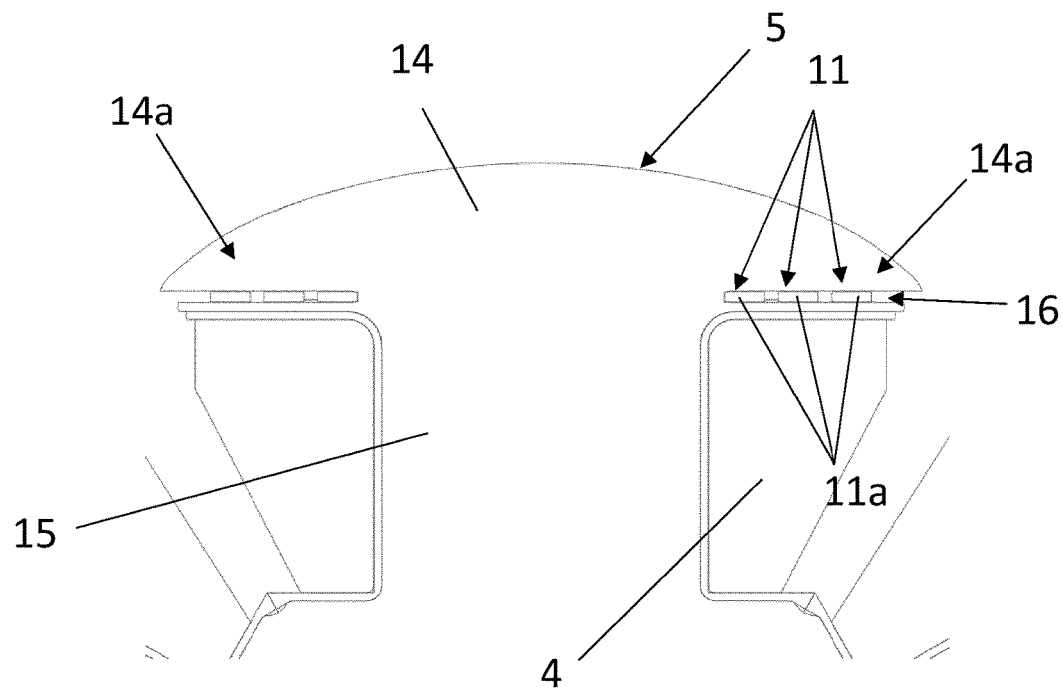
FIG. 5 shows a cross-sectional illustration through a salient pole.

Here, the axial roving portions 11a are arranged on the salient pole 5 in such a way that they run between a pole shoe 14 of the salient pole 5 and axial winding conductor portions of the winding 4 which is wound around a rotor tooth 15 of the salient pole 5. This is shown in FIG. 5, in particular, on the basis of the cross-sectional illustration of the salient pole rotor 1 in the region of the salient pole 5. Here, in each case three windings are arranged per salient pole pair on pole shoe regions 14a which project along the circumferential direction on the respective rotor tooth 15, with the result that two opposite windings are strapped by a total of six windings.

In order to arrange the first roving portions 11a in an axial gap 16 which lies radially between the windings 4 and the pole shoes 14, the roving 11 is first of all deflected along the circumferential direction, and is pushed into the gaps 16 in the circumferential direction. In order to prevent slipping of the second roving portions 11b on the end sides 2a here, the star disks 6 have insertion aids 17 here. These insertion aids 17 fix the roving 11 at the location of the transition between the second roving portion 11b and the first roving portion 11a. Here, the insertion aids 17 are pins 18 which project axially on the winding heads 7, it being possible for the roving 11 to be arranged between two pins 18 and therefore to be fixed in the circumferential direction in this region. Here, the pins 18 are arranged on insulation parts 19 of axially projecting overhangs 20 of the star disks 6 which likewise support the winding heads 7 radially.

Figure 6:
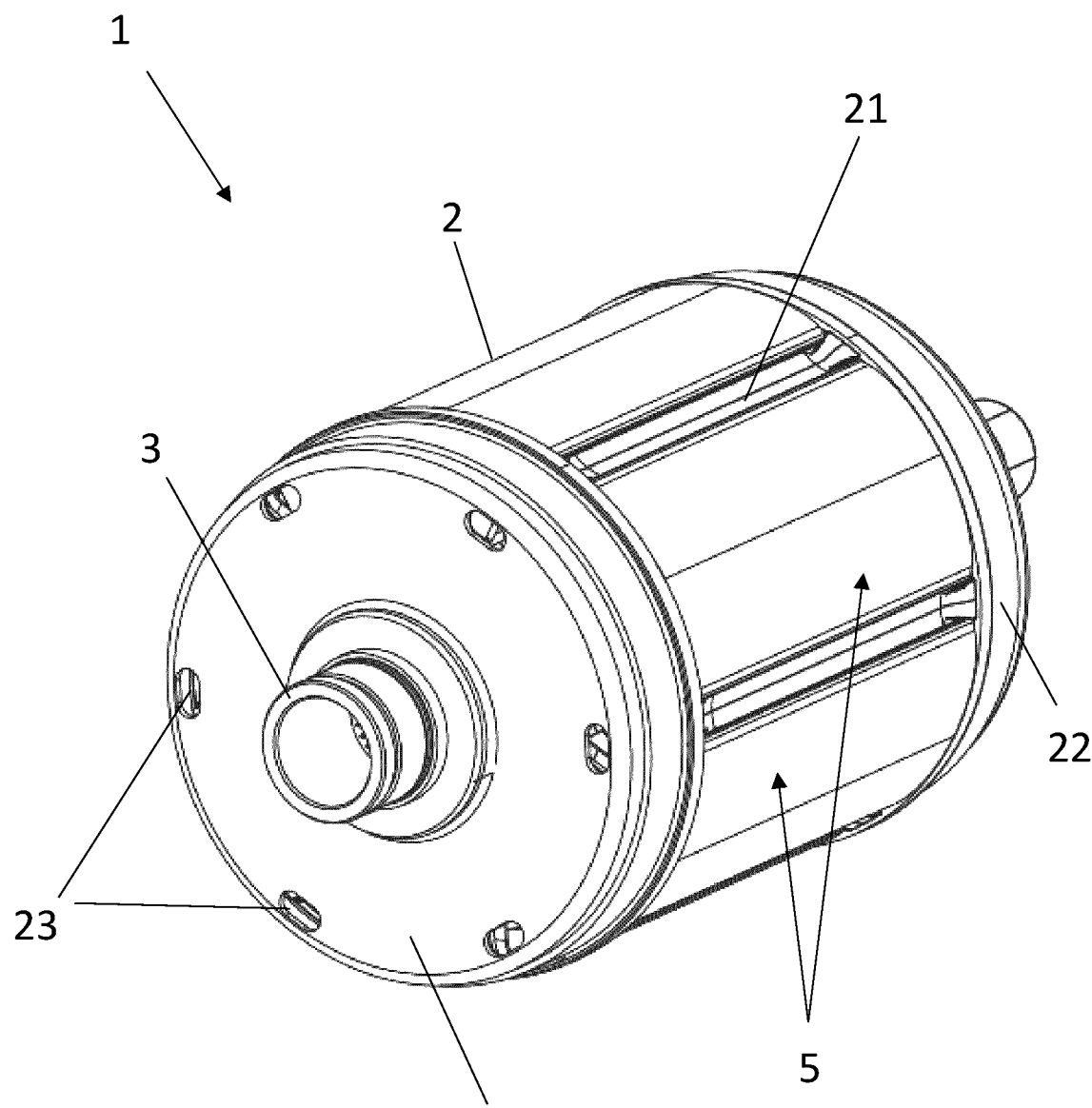
FIG. 6 shows a perspective illustration of a finally assembled salient pole rotor.

FIG. 6 shows the finally assembled salient pole rotor 1. Here, sliding covers 21 or groove closure wedges which close a groove or pole gap formed between two salient poles 5 are arranged between two salient poles 5. Moreover, the salient pole rotor 1 has supporting rings 22 which are arranged on the axially opposite end sides 2a and are connected mechanically to the star disks 6. Here, the supporting rings 22 surround the star disks 6 and therefore the winding heads 7. The supporting rings 22 have filling openings 23, via which a cavity below the supporting rings 22, in which, inter alia, winding heads and the roving winding 11 are situated, can be filled with a potting compound. A potting compound of this type can be, for example, a potting resin, by way of which the rotor winding 4 can be stabilized and protected further. This potting compound with the roving winding 11 forms a fiber composite body which is capable of absorbing a large part of the centrifugal forces of the winding heads 7. This makes it possible for the additional supporting structures, for example the star disks 6 and the supporting ring 22, to be designed to be as thin as possible and/or to be configured from a material which is optimized for cooling the salient pole rotor 1.

What is claimed is:

1. A salient pole rotor for an electric machine, the salient pole rotor comprising:
   a rotor core which has a rotor yoke and salient poles which are arranged distributed in a circumferential direction on the rotor yoke, each two salient poles which lie radially opposite one another forming a salient pole pair, and each salient pole having a rotor tooth and a pole shoe;
   magnetic field-generating windings which are wound around the rotor teeth of the salient poles and configure winding heads on opposite end sides of the rotor core; and
   a supporting apparatus for supporting the winding heads, wherein:
   the supporting apparatus has a tensioning and deflecting device and a roving winding with a roving, by way of which a plurality of windings are formed which are offset in the circumferential direction and encompass the windings of in each case one salient pole pair, and
   the roving has axial first roving portions and end-side second roving portions, the second roving portions being guided over the winding heads by way of the tensioning and deflecting device in order to configure a winding between salient poles which lie radially opposite one another, and being deflected along the circumferential direction during guiding over the winding heads in order to configure a winding transition between two windings.

2. The salient pole rotor according to claim 1, wherein:
   for each salient pole pair, the roving winding has at least two windings which are arranged on pole shoe regions of the pole shoes which lie opposite one another in the circumferential direction and project on respective rotor teeth.

3. The salient pole rotor according to claim 1, wherein:
   the roving is configured as a plastic fiber bundle or as a glass fiber bundle.

4. The salient pole rotor according to claim 1, wherein:
   the tensioning and deflecting device has two tensioning and deflecting rollers which are arranged on the end sides of the rotor core which lie axially opposite one another.

5. The salient pole rotor according to claim 4, wherein:
the tensioning and deflecting rollers have a plurality of guide grooves which are arranged axially above one another in order to deflect the second roving portions and to guide the second roving portions past a rotor shaft of the salient pole rotor.

6. The salient pole rotor according to claim 4, wherein:
a roving start of the roving is wound multiple times around one of the tensioning and deflecting rollers in order to fix the roving by way of configuration of a roving tension.

7. The salient pole rotor according to claim 1, wherein:
axially extending gaps are configured between the windings and the pole shoes of the salient poles, in which gaps the first roving portions are arranged.

8. The salient pole rotor according to claim 7, wherein:
the salient pole rotor has two star disks which are arranged between the end sides of the rotor core and the winding heads, and which have insertion aids for tangential insertion of the first roving portions into the gaps.

9. The salient pole rotor according to claim 8, wherein:
the insertion aids are configured as pins, projecting axially on the winding heads, of the star disks, between which the roving is arranged in a region of a transition between the first roving portions and the second roving portions, the pins being designed to prevent slipping of the second roving portions along the circumferential direction during insertion of the roving into the gaps.

10. The salient pole rotor according to claim 1, wherein:
the salient pole rotor has supporting rings which are arranged on the end sides in order to encase the winding heads, cavities below the supporting rings, in which the winding heads and the roving winding are arranged, being filled with a potting material in order to configure a fiber composite material which comprises the roving winding.

11. An electric machine for a motor vehicle, the electric machine comprising:
a stator; and
the salient pole rotor according to claim 1, wherein the salient pole rotor is mounted rotatably with regard to the stator.

* * * * *